May 22, 1934.  C. MERCER  1,959,487
MACHINE FOR THE MANUFACTURE OF MACHINED BOLTS AND NUTS
Filed Feb. 17, 1933  6 Sheets-Sheet 1

Fig.1

INVENTOR
Charles Mercer,
By:- Smith, Michael and Gardiner,
Attorneys.

May 22, 1934.  C. MERCER  1,959,487
MACHINE FOR THE MANUFACTURE OF MACHINED BOLTS AND NUTS
Filed Feb. 17, 1933   6 Sheets-Sheet 3

INVENTOR
Charles Mercer,
By:-
Smith, Michael & Gardiner,
Attorneys.

May 22, 1934.    C. MERCER    1,959,487
MACHINE FOR THE MANUFACTURE OF MACHINED BOLTS AND NUTS
Filed Feb. 17, 1933    6 Sheets-Sheet 5

INVENTOR.
Charles Mercer
By.— Smith, Michael and Gardiner,
Attorneys.

Patented May 22, 1934

1,959,487

UNITED STATES PATENT OFFICE 1,959,487

MACHINE FOR THE MANUFACTURE OF MACHINED BOLTS AND NUTS

Charles Mercer, Radlett, England

Application February 17, 1933, Serial No. 657,282
In Great Britain February 18, 1932

7 Claims. (Cl. 10—8)

This invention is for improvements in or relating to the manufacture of screw threaded elements, such as bolts and nuts having polygonal surface portions.

In the production of machined bolts two general methods are known. In one, the bolt is produced from a forging, the head being machined and the shank pointed, machined and screw-threaded in a series of separate operations. In the other method, the bolt is produced from bright rolled hexagonal rod which is turned down to form the shank of the bolt, which shank is afterwards screw-threaded.

Of these two methods, the former is generally the more economical for bolts down to a certain size, owing to the saving in material which is involved, as compared with the hexagonal rod method, in eliminating the step of turning down the rod to form the shank. In this connection it may be noted that the saving of material referred to is sufficient to compensate for the extra cost of production involved, as compared with the hexagonal rod method, in machining in separate operations each involving a fresh setting up of the work, the crude head and other parts of the forging. In the case, however, of the smaller-sized bolts, that is to say, bolts of a size below the economic minimum size referred to above, the loss of material involved in turning down the shank from an hexagonal rod, is so small as to be negligible, having regard to the fact that the head of the bolt which is formed from the rod has not to be machined, as in the forging method, at least so far as the flats of the head are concerned.

A practical difficulty is experienced, therefore, in applying the forging method to the production of smaller-sized bolts, in that, by present methods the expense of machining the head flats and other parts of the bolt tend to neutralize any saving in metal losses resulting from the elimination thus( by operating upon a forging) of the necessity of turning down the shank of the bolt from an hexagonal rod.

The present invention has for a primary object to meet this particular difficulty by providing an improved method of forming or machining bolt head flats.

According to the present invtntion, a process for the manufacture of screw threaded elements having polygonal surface portions consists in forming the flats of the polygon on a plurality of element blanks simultaneously by the method which consists in simultaneously rotating the several blanks in the same direction and at the same speed around their longitudinal axes, the latter being disposed in spaced relationship to one another around a pitch-circle, and the element blanks all being disposed in one general plane perpendicular to said longitudinal axes, while rotating, in the same direction as the element blanks and around the axis of the said pitch-circle, a plurality of flatting tools disposed at equal angular intervals apart around said pitch-circle axis and in operative engagement at their cutting edges with the peripheries of the element blanks, the number of the flatting tools being equal to the number of flats to be formed on each element blank divided by the ratio of the speed of rotation of the flatting tools to that of the element blanks.

If the bolt heads or nuts to be formed or machined are of hexagonal form, the number disposed on the pitch-circle aforesaid may be any convenient number, say, six, and the number of flatting tools on the rotatable tool carrier could be three, in which event the speed of rotation of the tool carrier would be twice that of the bolt heads or nuts.

By operating in accordance with this procedure, the flats of bolt heads or nuts may be formed or machined with great expedition and accuracy, and the practical difficulty referred to above, in applying the forging method to the production of smaller-sized bolts, may be effectively met with consequent considerable net saving in the manufacture of the finished bolt.

In this connection, it is to be understood that although the invention has particular application to the production of smaller-sized bolts by the forging method, it is not limited thereto, but is broadly applicable in this respect to the formation or machining of flats of bolt heads in general.

In the ensuing description and claims the term "screw threaded elements having polygonal surface portions" is intended to cover both nuts and bolts.

Further, the term "flatting" is used herein to denote, both forming flats on bolt heads or nuts and also machining already-formed flats.

In the case of machining the flats of a nut, the crude nut may be screwed on to a mandrel to constitute a temporary shank for supporting the nut in position in relation to the flatting tool.

According to a further feature of the invention, the step in the manufacture of screw threaded elements of forming or machining the flats of a plurality of element blanks simultaneously as specified above may be combined with (for example, followed in the sequence of operations by) the step of machining the face of the bolt heads or nuts by feeding a facing tool, in the plane of the face to be produced, towards the axis of the element blank while rotating the latter about its said axis.

It is to be understood, in this connection, that the invention is not limited to that form of the process referred to in which the facing step follows the flatting operation; if desired, the two operations can be performed simultaneously.

Conveniently, the flatting tools which produce the flats on the screw threaded elements may be progressively fed along the element blank, that is to say, in a direction parallel to the axis of the tool carrier, during the flatting operation.

The invention includes, moreover, a machine.

According to this aspect of the invention, a machine for the manufacture of screw threaded elements having polygonal surface portions comprises a plurality of rotatable chucks adapted to hold a plurality of element blanks (one blank in each chuck) in one general plane, the longitudinal axes of the chucks being disposed in spaced relationship to one another around a pitch circle with their axes parallel to one another, said chucks being rotatable about their axes all at the same speed and all in the same direction, and a plurality of flatting tools radially disposed at equal angular intervals around said pitch circle and operable to engage at their cutting edges with the peripheries of the element blanks and rotatable in the same direction as the chucks about the axis of the said pitch circle, the number of flatting tools being equal to the number of flats to be formed on each element blank divided by the ratio of speed of the flatting tools to the speed of the chucks.

According to another feature of the invention, the said machine may comprise the parts specified above in combination with means for progressively feeding the tool carrier axially of itself during the flatting operation to cause the flatting tools to feed their way along the screw threaded elements.

According to another feature still, the said machine may comprise the said parts specified in the last preceding paragraph but one, with or without the means referred to in the last paragraph, in combination with a plurality of facing tools for the screw threaded elements corresponding in number to the chucks and mounted upon a carrier member common to them all and rotatable through an arc around the axis of the chuck pitch-circle to feed the facing tools across the end of the screw threaded elements in the chucks during the rotation of the latter.

Preferably, control means are provided, whereby the whole machine is rendered substantially automatic in its action. Any convenient form of control means may be employed to this end; for example, the flatting tool carrier, upon reaching the end of its axial stroke, may be arranged to operate an electric switch functioning to cause cessation of rotation of said carrier and, at the same time, a speeding-up of the chucks and the commencement of feed movement of the facing tool carrier, and then, upon this carrier having reached the end of its stroke, another switch may be operated by it which functions to occasion complete cessation of movement of all of the parts of the machine, followed immediately by an automatic release of the whole of the chucks to enable the operator to remove the screw threaded elements and replace them by a fresh set.

The invention will now be further described with reference to the accompanying drawings, which illustrate by way of example one form of machine suitable for carrying the process of the invention into effect, as applied to the cutting of flats on the heads of forged bolt blanks.

In these drawings:—

Like reference numerals indicate like parts in the various figures of the drawings.

Briefly described, the machine comprises a general framework 1, in which are mounted a series of six collet chucks 2. These chucks are equally spaced, as shown, around a pitch circle 3 and are disposed with their axes parallel to one another in one general plane perpendicular to the axis of this circle.

Also mounted in the framework 1 is a flatting-tool carrier 4 rotatable about the axis of the pitch circle 3 and carrying upon its periphery a series of three flatting tools 5. These tools 5 are equally spaced around said periphery of the carrier 4.

The carrier 4 is arranged to rotate at twice the speed of the chucks 2 and in the same direction thereas. At the same time, it is moved progressively, axially of itself, to feed the flatting tools 5 along the heads of the bolts 6 in the chucks. This progressive axial movement of the carrier 4 is first in one direction, when operating on one set of bolts, and then in the reverse direction when operating on the next set. Or, if desired, the arrangement may be one in which the operative axial stroke of the carrier 4 is always in the same direction, the carrier being returned each time to an initial position, preferably by automatic returning mechanism.

Mounted upon the front (right-hand in Figures 1 and 2) end of the machine, is an annular carrier 7 for a set of six holders 8 for facing tools 9 and chamfering tools 10. This carrier 7 is rotatable on the framework 1 of the machine, about the axis of the flatting-tool carrier 4, through an arc of about 30° from an initial position in which the facing and chamfering tools 9, 10 are located clear of the heads of the bolt blanks in place in the chucks, that is to say, while the flatting operation is in progress, to a final position, at the end of the operative feed of the facing and chamfering tools, in which the facing tools have reached the centres of the (now finished) bolt heads and the chamfering tools also the limit of their feed movement.

The chamfering tools, as will be appreciated, commence to operate upon the edge of the head face towards the close of the feed of the facing tool thereacross and finish their cut simultaneously with the finish of the facing tool cut. They then are retracted by return stroke of the carrier 7 to its initial position aforesaid. The drawings show the carrier 7 and its tools 9, 10 in the finishing position of their operative feed stroke.

Figure 1:
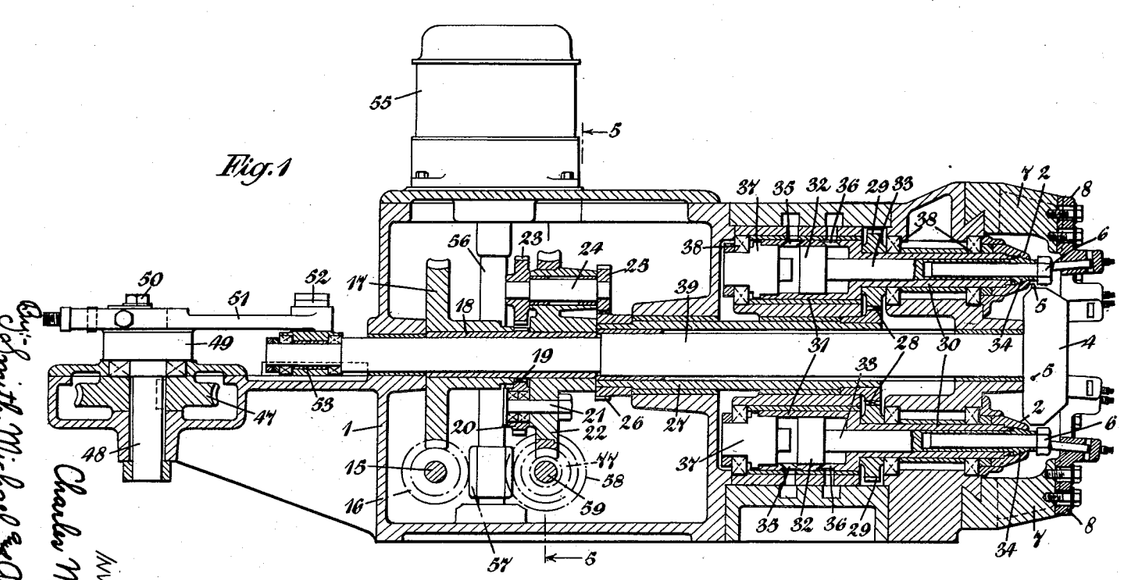
Figure 1 represents, somewhat diagrammatically, a vertical longitudinal central section through the machine.
Figure 2:
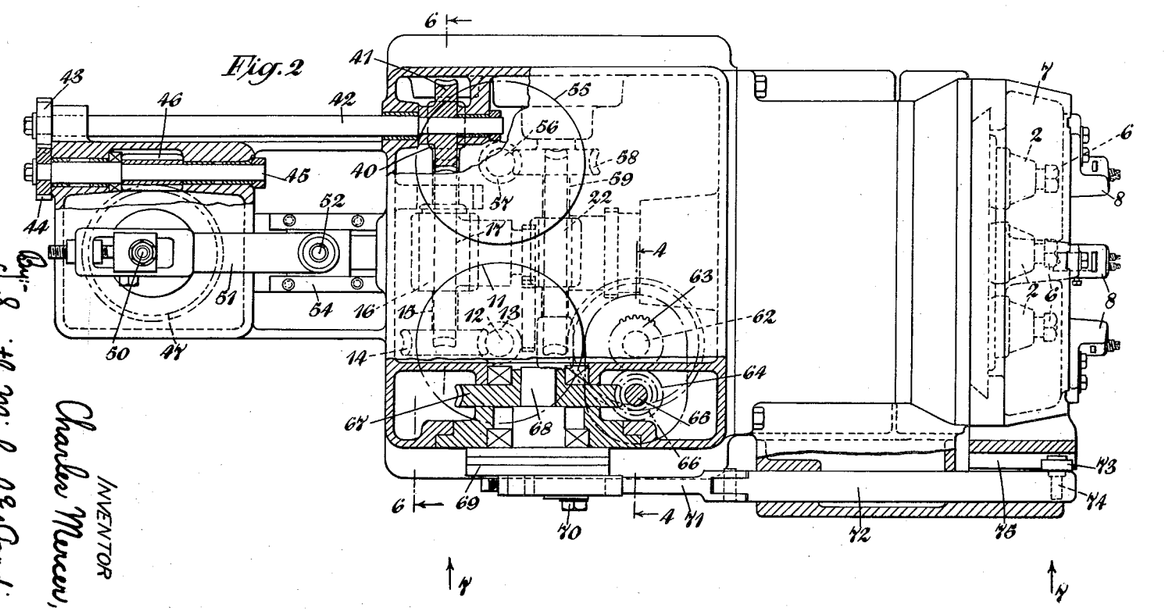
Figure 2 is a plan of the machine with certain parts broken away to show the details.
Figure 3:
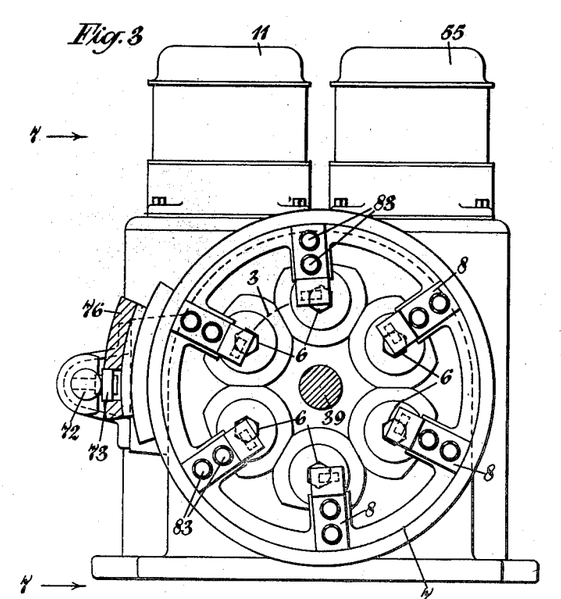
Figure 3 is an end view of the machine looking to the right-hand (in Figure 1) end thereof.
Figure 4:
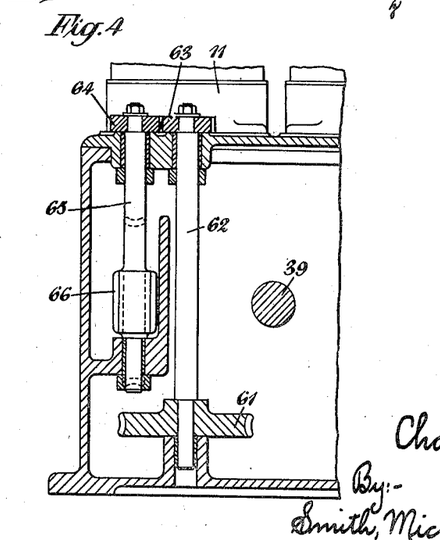
Figure 4 is a vertical transverse section through one side of the machine, taken on the section line 4—4 of Figure 2.
Figure 5:
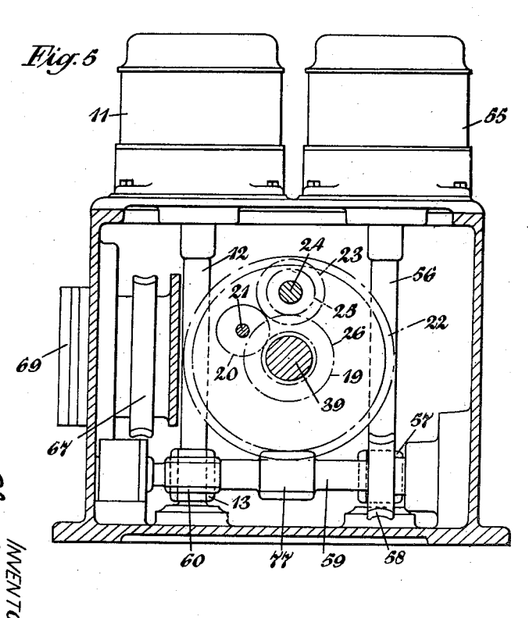
Figure 5 is another vertical transverse section, taken along the section line 5—5 of Figure 1.
Figure 6:
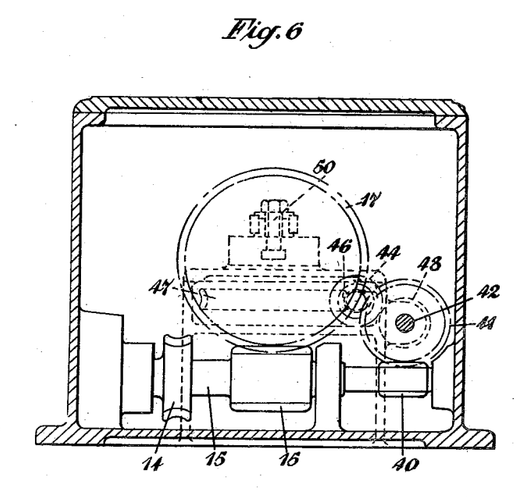
Figure 6 is a vertical transverse section, taken through the machine along the section line 6—6 of Figure 2.
Figure 7:
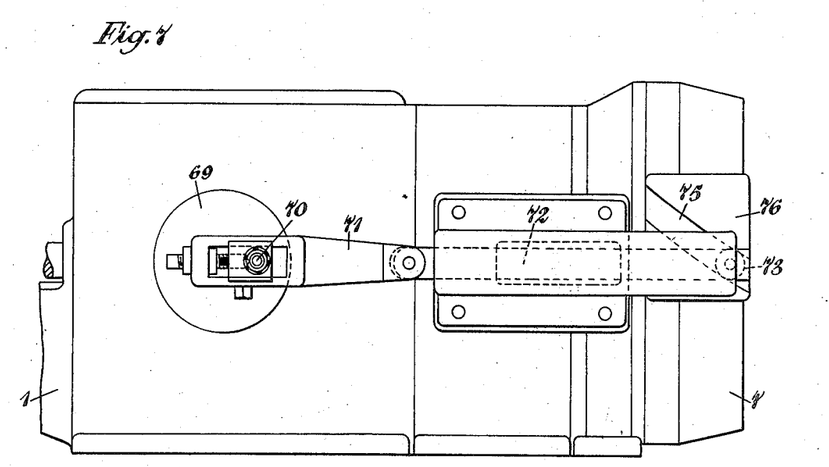
Figure 7 is an outside elevation of the machine, looking in the direction of the arrows 7—7 of Figures 2 and 3.

During the facing and chamfering operation, which, it will be appreciated, follows the flatting step, the collet chucks are revolved at a considerably faster rate than during the flatting operation, for example, at twelve times the speed, and the flatting tools are stationary. With this in view, the terminal position in the axial movement of the carrier 4 is a position in which the flatting tools 5 are brought beyond the plane of the end faces of the bolt heads in position in the chucks, as shown in Figure 1.

The driving mechanism for the tool carriers 4, 7 will now be described.

The collet chucks 2 are driven at, say 20 revolutions per minute, by an electric motor 11, through transmission shafting and gearing including shaft 12, worm 13 thereon, worm wheel 14, horizontal shaft 15, worm 16 thereon, worm wheel 17, sleeve 18 keyed to the boss of worm wheel 17, spur tooth 19 on sleeve 18 intermediate pinion 20 on pin 21 mounted in worm wheel 22, planet wheel 23 on pin 24 also mounted in worm wheel 22, planet pinion 25 on pin 24, spur teeth 26 on the rear end of sleeve 27, spur teeth 28 on the forward end of said sleeve 27, toothed wheels 29, one per chuck, and shank sleeve 30 of the chucks.

Said shank sleeves 30 are keyed to the wheels 29 and are integral with ram cylinders 31, in which work rams 32 connected by ram rods 33 to the gripping jaws 34 of the clutches. The ram cylinders 31 are provided with ports at each end, as shown 35, 36. By admitting oil (say) under pressure to the rear (left hand in Figure 1) ports 35, the rams 32 are forced to the right and the collet chuck jaws close firmly upon the bolt shanks inserted within them. This condition obtains, as will be appreciated, throughout the process of forming (or machining) the flats of the bolt head and the subsequent step of facing the head and chamfering its edge.

Upon completion of the various forming (or machining) operations upon the bolt head, ports 35 are opened to exhaust by suitable valve mechanism (not shown) and fluid under pressure is admitted to the ram cylinders through ports 36. This results in rams 32 being forced to the left, with consequent release of the collet chuck jaws from the bolt shanks within them.

The ram cylinders 31 are closed at the rear end by cylinder ends 37, and the composite structure in each case, of collet chuck, ram cylinder, ram and toothed wheel 29, is mounted in the general framework 1 through the intermediary of ball or roller bearings, shown diagrammatically and denoted by the numeral 38.

The flatting tool carrier 4 is driven at twice the speed of rotation of the collet chucks by the same electric motor 11 as that by which the chucks are driven, the transmission shaft and gearing comprising the following elements—the aforesaid shaft 12, worm 13, worm wheel 14, shaft 15, worm 16, worm wheel 17, sleeve 18 and a main central shaft 39 having the facing tool carrier 4 mounted upon the forward end of it.

The said carrier 4 is advanced to and fro, in its axial movement to feed the facing tools along the bolt heads as they cut (or machine) the flats thereon, by feed gear driven by the aforesaid motor 11 and comprising the following elements—shaft 12, worm 13, worm wheel 14, shaft 15, a worm 40 on shaft 15, a co-operating worm wheel 41, mounted on a horizontal shaft 42, spur gears 43, 44, a second horizontal shaft 45, a worm 46 thereon, meshing with a worm wheel 47 mounted upon a vertical shaft 48 carrying at the top an eccentric-disc 49 having an eccentric-pin 50 mounted upon it and connected by a connecting rod 51 to a cross-head pin 52 in a double-ended thrust block 53 mounted upon the rear extremity of shaft 39 and slidable to and fro with the advance and retraction of said shaft, in slides 54.

As will be understood, with an arrangement of this description, the flatting tool carrier 4 is designed to perform an operative stroke, first in one direction, when operating upon one set of bolts in the collet chucks, and then in the reverse direction, when operating upon the next set, and to this end, the gear-ratio of the parts of the feed gear for the carrier 4 are so proportioned, relatively to the gear-ratios of the various elements of the collet chuck drive and the rotational drive of the carrier 4, that the worm wheel 47 and consequently the eccentric-disc 49, move through exactly one half of a revolution from dead-centre position to dead-centre position, in the time that the flatting tools 5 take to complete their flatting or machining work upon the bolt heads in the chucks. In this connection, it will be seen that Figures 1 and 2 of the drawings show the parts with the tool carrier 4 in the left-hand (or retracted) position and consequently the eccentric-disc 49 in the left-hand dead-centre position.

It is to be noted that the intermediate pinion 20 and planet wheel 23 aforesaid are not shown strictly in their true relative positions in Figure 1; actually they mesh with one another, as will be evident from the description of these parts given above.

The annular facing tool carrier 7, which, as previously described, is angularly movable about the axis of shaft 39 to feed the facing tools 9 and chamfering tools 10 progressively towards the centres of the bolt heads in the collet chucks as these heads are rotated therein, is driven through its arc of movement, first in one direction and then in the reverse, by an electric motor 55, through shafting and gearing comprising the following elements—vertical shaft 56, worm 57 thereon, co-operating worm wheel 58 on horizontal shaft 59, worm 60 on shaft 59, co-operating worm wheel 61 on the lower end of the vertical shaft 62, spur gears 63, 64, gear 64 being mounted upon the upper end of a second vertical shaft 65, worm 66 on the lower part of shaft 65, co-operating worm wheel 67, keyed to horizontal shaft 68 fast with a crank disc 69 external to the framework 1, crank pin 70 on discs 69, connecting rod 71, slide bar 72 and cam roller 73 mounted upon pin 74 in the forward end of slide bar 72 and working in an inclined cam-slot 75 provided in the periphery 76 of the annular facing tool carrier 7. As will be understood, reciprocatory motion of slide bar 72 occasions an angular movement of tool carrier 7 about the axis of shaft 39, through the cam-action of roller 73 and cam groove 75, the carrier 7 being advanced through its operative stroke by movement of slide bar 72 in one direction and retracted to its initial position by the reverse movement of said bar 72.

As previously mentioned herein, the collet chucks and, consequently, the bolt blanks held therein, are driven at a considerably higher speed (say, 240 revolutions per minute) during the facing and chamfering operation, than during the flatting step. With this in view, an additional gear train is provided in the collet chuck drive. Thus, during the facing and chamfering operation, the collet chucks are driven, at the higher speed referred to, by the motor 55, through the aforesaid vertical shaft 56, worm 57, worm wheel 58 and shaft 59, and thence to the collet chucks through the intermediary of a worm 77 on the centre of shaft 59, the aforesaid worm wheel 22, which is freely revoluble on sleeve 18, intermediate pinion 20, planet wheel 23, pin 24, planet wheel 25, spur teeth 26, sleeve 27, spur teeth 28, toothed wheel 29 and sleeve 30.

Figure 11:
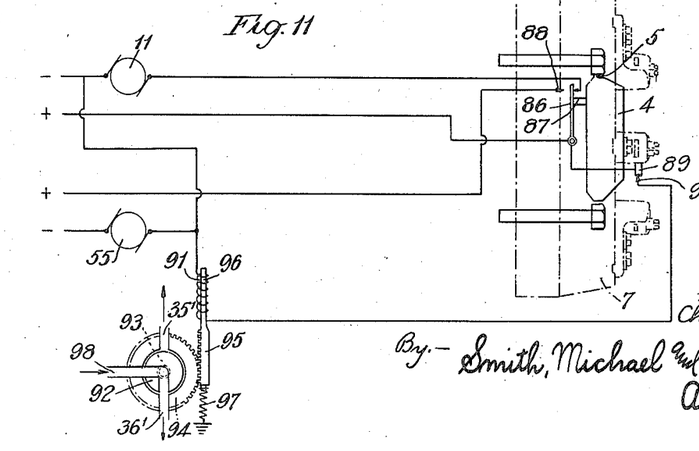
Figure 11 is a diagrammatic representation of an automatic control system for the machine illustrated in Figures 1 to 10.

An automatic control for the machine above described is illustrated diagrammatically in Figure 11. For the sake of clearness, the only parts of the machine shown in Figure 11 are the flatting and facing tool carriers. Referring to Figure 11, the electric motor 11, which drives the flatting tool carrier 4 during the flatting operation, is connected to the supply mains through a switch 86 arranged to be opened by a projection 87 on the flatting tool carrier when the latter reaches the end of its axial stroke with the flatting tools 5 clear of the bolt heads in the chucks. In parallel with the motor 11 is arranged a solenoid 91 for operating the mechanism (described later) for releasing the finished bolts from the chucks. The circuit of the solenoid 91 comprises one terminal of the supply mains, the windings of the solenoid, a fixed terminal 90 co-operating with a contact 89 on the facing tool carrier 7 which is connected through switch 86 to the other terminal of the supply mains. The opening of the switch 86 simultaneously effects the closing of the switch 88 in the circuit of the motor 55 which is thereupon brought into operation to drive the collet chucks at the higher speed referred to and at the same time to advance the facing tool carrier 7 through its operative stroke to the position shown in the drawings. The circuit of the motor 55 comprises the supply mains, switch 88, contact 89 on the facing tool carrier 7, fixed contact 90, solenoid 91, through the motor and back to the supply mains. The contact 89 comprises a conducting sector which moves with the facing tool carrier relatively to the fixed contact 90 and is so arranged that the circuit through the solenoid 91 is made both during the operation of the flatting tools and during the operation of the facing tools but that when the facing operation is completed the sector moves out of connection with the contact 89 as a result of the rotation of the facing tool carrier and breaks the circuit both through the motor 55 and through the solenoid 91.

The mechanism for releasing the bolts from the chucks comprises a simple, two-way valve mechanism of known type having a rotary element 92 secured to a shaft 93 to which is keyed a pinion 94 in operative connection with a rack 95 fixed to one end of a plunger 96 mounted within the solenoid 91. The plunger 96 is connected to a spring or other yielding control 97 arranged to move the plunger 96 in a direction opposite to the electro-magnetic pull exerted thereon by the solenoid 91 when the latter is energized.

The valve mechanism also comprises an inlet port 98 in communication with a reservoir or oil under pressure (not shown) and discharge ports $35^1$ and $36^1$ communicating respectively with the ports 35 and 36 in the machine. During normal operation of the machine, the port 98 is connected to port $35^1$ but when the flatting and facing operations upon one set of bolt heads have been completed and the circuit through the motor 55 and therefore also through the solenoid 91 broken, the plunger 96 moves under the action of the control spring 97 to rotate the movable element 92 so as to connect the port $36^1$ to the port 98 and thereby to release the chucks in the manner hereinbefore described. In this connection, it will be appreciated that, when the tool carrier 7 has reached the end of its operative stroke, the continued rotation of the crank disc 69 will retract it back to its initial position and that this forward advance and subsequent retraction of the tool carrier 7, is effected during one complete revolution of crank disc 69. Upon the carrier 7 reaching its fully retracted position, the automatic control effects stopping of the motor 55 in readiness for the next flatting operation, performed upon the next set of bolt blanks to be operated upon in the machine.

In order that the machine shall be capable of being used with a variety of sizes of bolts, in respect of the depth and diameter of the bolt head, the eccentric-pin 50 is preferably, as shown, adjustable in its position relatively to the axis of the eccentric-disc 49, and similarly, the crank pin 70 of the feed gear for the facing tool carrier 7 is adjustable radially of the crank disc 69. Any convenient form of adjustment may be employed to this end.

Figure 8:
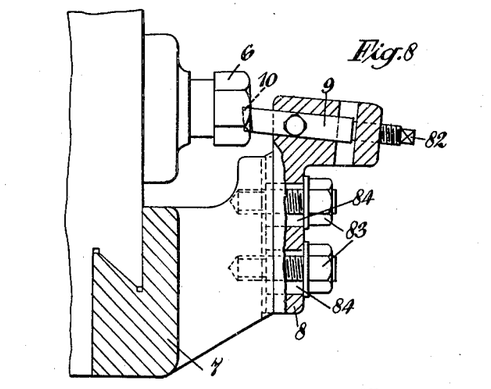
Figure 8 is a longitudinal section, on a larger scale than the previous figures, through one of the facing tool holders and its carrier.
Figure 9:
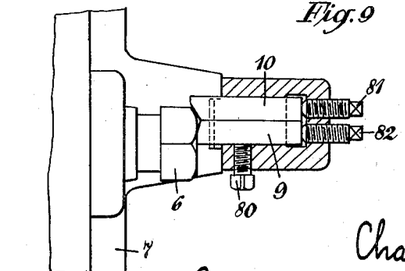
Figure 9 is a plan view corresponding to Figure 8.

Referring now more specifically to Figures 8 and 9, it will be seen that the tools 9, 10 are mounted together in a holder 8 which is common to them both, and that a single set screw 80 suffices for both tools, tool 10 being clamped firmly against the wall of the holder through the intermediary of tool 9. It will further be noted that the two tools 9, 10 are separately adjustable in the direction of their length by a pair of set screws 81, 82. Finally, it will be seen that the holder 8 is adjustable in a direction parallel to the general plane of the tool carrier 7, being held thereon by fixing bolts 83, the shanks of which pass through elongated receiving holes 84 in the holder 8. This arrangement of parts, as will be appreciated is exceedingly simple and lends itself to ready adjustment and replacement, when necessary, of the tools 9, 10.

Figure 10:
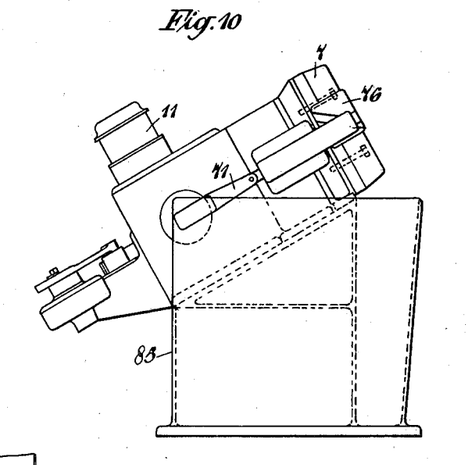
Figure 10 is an elevation, on a smaller scale than Figures 1–7, showing the machine mounted in an inclined position for the convenience of the operator in removing the bolts from the chucks and replacing them in the machine by a fresh set.

With regard to Figure 10, this figure, as previously explained, shows the machine mounted bodily in an inclined position upon a support 85 for the greater convenience of the operator, the forward end face of the machine being turned partially upwardly, as shown, to facilitate the operation of removing and replacing the bolts in the collet chucks.

It will be obvious that the invention is capable of considerable variation in regard to the general arrangement and details of construction of the various parts of the machine, without departure from its scope. For instance, the driving mechanism for the collet chucks and the tool carriers may take any convenient form other than the specific form described above and illustrated in the drawings, as also may the chucks which hold the bolts. Again, instead of revolving the flatting tools, the axes of the collet chucks being stationary, the chucks may be revolved epicyclically around the axis of the flatting tool holder, the latter, in this case, being stationary in the machine.

What I claim and desire to secure by Letters Patent of the United States is:—

1. Machine for the manufacture of screw threaded elements having polygonal surface portions, which machine comprises a plurality of rotatable chucks adapted to hold a plurality of element blanks (one blank in each chuck) in one general plane, the longitudinal axes of the chucks being disposed in spaced relationship to one another around a pitch circle with their axes parallel to one another, the said chucks being rotatable about their axes all at the same speed and all in the same direction, and a plurality of flatting tools radially disposed at equal angular intervals around said pitch circle, and operable to engage at their cutting edges with the peripheries of the element blanks and rotatable in the same direction as the chucks about the axis of the said pitch circle, the number of flatting tools being equal to the number of flats to be formed on each element blank divided by the ratio of speed of the flatting tools to the speed of the chucks.

2. Machine for the manufacture of screw threaded elements having polygonal surface portions, which machine comprises a plurality of rotatable chucks adapted to hold a plurality of element blanks (one blank in each chuck) in one general plane, the longitudinal axes of the chucks being disposed in spaced relationship with one another around a pitch circle with their axes parallel to one another, the said chucks being rotatable about their axes all at the same speed and all in the same direction, a plurality of flatting tools radially disposed at equal angular distances around the said pitch circle and operable to engage at their cutting edges with the peripheries of the element blanks and rotatable in the same direction as the chucks about the axis of the said pitch circle, the number of flatting tools being equal to the number of flats to be formed on each element blank divided by the ratio of the speed of the flatting tools to the speed of the chucks, and means for progressively feeding the flatting tools axially of themselves during the flatting operation to cause the flatting tools to feed their way along the element blanks.

3. Machine for the manufacture of screw threaded elements having polygonal surface portions, which machine comprises a plurality of rotatable chucks adapted to hold a plurality of element blanks (one blank in each chuck) in one general plane, the longitudinal axes of the chucks being disposed in spaced relationship with one another around a pitch circle with their axes parallel to one another, the said chucks being rotatable about their axes all at the same speed and all in the same direction, a plurality of flatting tools operable to engage at their cutting edges with the periphery of the element blanks and rotatable in the same direction as the chucks about the axis of the said pitch circle, the number of flatting tools being equal to the number of flats to be formed on each element blank divided by the ratio of the speed of the flatting tool to the speed of the chucks, and a plurality of facing tools for the element blanks corresponding in number to the chucks, the said facing tools being rotatable through an arc around the axis of the chuck pitch-circle so as to feed the facing tools across the ends of the element blanks in the chucks.

4. Machine for the manufacture of screw threaded elements having polygonal surface portions which machine comprises a plurality of rotatable chucks adapted to hold a plurality of element blanks (one blank in each chuck) in one general plane, the longitudinal axes of the chucks being disposed in spaced relationship with one another around a pitch circle with their axes parallel to one another, the said chucks being rotatable about their axes all at the same speed and all in the same direction, a plurality of flatting tools operable to engage at their cutting edges with the peripheries of the element blanks and rotatable in the same direction as the chucks about the axis of the said pitch circle, the number of flatting tools being equal to the number of flats to be formed on each element divided by the ratio of speed of the flatting tools to the speed of the chucks, and a plurality of facing tools for the element blanks corresponding in number to the chucks and mounted upon a carrier member common to them all and rotatable through an arc around the axis of the chuck pitch circle to feed the flatting tools across the ends of the element blanks in the chucks.

5. Machine for the manufacture of screw threaded elements having polygonal surface portions, which machine comprises a plurality of rotatable chucks adapted to hold a plurality of element blanks (one blank in each chuck) in one general plane, the longitudinal axis of the chucks being disposed in spaced relationship with one another around a pitch circle with their axes parallel to one another, the said chucks being rotatable about the said axes all at the same speed and all in the same direction, a plurality of flatting tools operable to engage at their cutting edges with the peripheries of the element blanks and rotatable in the same direction as the chucks about the axis of the said pitch circle, the number of flatting tools being equal to the number of flats to be formed in each element divided by the ratio of the speed of the flatting tool to the speed of chucks, means for progressively feeding the flatting tools axially of themselves during the flatting operation to cause the flatting tools to feed their way along the element blanks, and a plurality of facing tools for the element blanks corresponding in number to the chucks, the said facing tools being rotatable through an arc around the axis of the chuck pitch circle so as to feed the facing tools across the end of the elements in the chucks.

6. Machine for the manufacture of screw threaded elements having polygonal surface portions which comprises a plurality of rotatable chucks adapted to hold a plurality of element blanks (one blank in each chuck) in one general plane, the longitudinal axes of the chucks being disposed in spaced relationship around a pitch circle with the axes of the chucks parallel to one another, the said chucks being rotatable about their axes all at the same speed and all in the same direction, a plurality of flatting tools operable to engage at their cutting edges with the peripheries of the element blanks and rotatable in the same direction as the chucks about the axis of the said pitch circle, the number of flatting tools being equal to the number of flats to be formed on each element divided by the ratio of the speed of the flatting tool to the speed of the chucks, means for progressively feeding the flatting tools axially of themselves during the flatting operation to cause the flatting tools to feed their way along the element blanks, and a plurality of facing tools for the element blanks corresponding in number to the chucks and mounted upon a carrier member common to them all and rotatable through an arc around the axis of the chuck pitch circle so as to feed the facing tools across the ends of the element blanks in the chucks.

7. Machine for the manufacture of screw threaded elements having polygonal surface portions which comprises a plurality of rotatable chucks adapted to hold a plurality of element blanks (one blank in each chuck) in one general plane, the longitudinal axes of the chucks being disposed in spaced relationship around a pitch circle with the axes of the chucks parallel to one another, the said chucks being rotatable about their axes all at the same speed and all in the same direction, a plurality of flatting tools operable to engage at their cutting edges with the peripheries of the element blanks and rotatable in the same direction as the chucks about the axis of the said pitch circle, the number of flatting tools being equal to the number of flats to be formed on each element divided by the ratio of the speed of the flatting tool to the speed of the chucks, means for progressively feeding the flatting tools axially of themselves during the flatting operation to cause the flatting tools to feed their way along the element blanks, a plurality of facing tools for the element blanks corresponding in number to the chucks and mounted upon a carrier member common to them all and rotatable through an arc around the axis of the chuck pitch circle so as to feed the facing tools across the ends of the element blanks in the chucks and control means for rendering the machine substantially automatic in action comprising a primary electric switch operable, when the flatting tools reach the end of their axial strokes, to effect the cessation of rotation of said flatting tools and simultaneously an acceleration of the chucks and the commencement of the feed movement of the facing tool carrier, and a second switch, operable by the carrier when the latter reaches the end of its angular stroke, to effect complete cessation of movement of all the parts of the machine and the subsequent automatic release of the chucks.

CHARLES MERCER.